United States Patent [19]

Kraus

[11] 4,296,317
[45] Oct. 20, 1981

[54] PAINT APPLICATION METHOD AND MACHINE

[76] Inventor: Roland Kraus, Mainlände 7, 8702 Veitshöchheim, Fed. Rep. of Germany

[21] Appl. No.: 1,437

[22] Filed: Jan. 8, 1979

[51] Int. Cl.$^3$ .......................................... G01D 15/18
[52] U.S. Cl. ..................................... 250/215; 346/75; 358/75
[58] Field of Search ......................... 250/215; 346/75; 358/75

[56] References Cited

U.S. PATENT DOCUMENTS

| | | | |
|---|---|---|---|
| 1,709,926 | 4/1929 | Weaver | 346/75 UX |
| 2,035,825 | 3/1936 | Muller | 358/75 |
| 2,413,706 | 1/1947 | Gunderson | 346/75 UX |
| 2,573,143 | 10/1951 | Jacob | 346/75 UX |
| 4,146,900 | 3/1979 | Arnold | 101/35 X |

Primary Examiner—David C. Nelms
Assistant Examiner—Darwin R. Hostetter
Attorney, Agent, or Firm—Max Fogiel

[57] ABSTRACT

A paint application method with manual or automatic guidance of the spray gun at a constant distance from the working surface in the zone of picture reproduction, with the amount of sprayed paint controlled by the intensity of a light beam guided by a picture pattern. The light beam strikes a photocell cooperating with a control element of the spray opening of the spray gun, the photocell or/and the picture pattern being moved synchronously with the guide movement of the spray gun. With manual guidance of the spray gun, the light beam may be a projection beam which projects the picture pattern on the working surface. The spray opening may be guided automatically row for row over the working surface. A stationary photocell may be connected electrically to the control element of the spray gun, or a photocell mechanically connected to the spray gun may be used and the picture pattern displaced vertically in synchronism with the vertical guide movement of the spray gun in a plane perpendicular to the beam and the photocell with light source and beam displaced horizontally in synchronism with the horizontal guide movement of the spray gun relative to the picture pattern.

26 Claims, 19 Drawing Figures

PAINT APPLICATION METHOD AND MACHINE

BACKGROUND OF THE INVENTION

The invention relates to a paint application method and a machine for carrying out the method.

The object of the invention is the creation of a paint application method and a paint application machine which makes possible the reproduction true to scale and of identical color of a unicolor or multicolor lettered and/or picture pattern, semiautomatically or fully automatically as a reproduction formed by paint application on a spatially removed plane or slightly curved working surface of an object.

SUMMARY OF THE INVENTION

This is achieved by the method by guiding the spray opening of the spray gun manually or automatically at a constant distance from the working surface in the zone of the picture reproduction to be furnished by paint application, and by controlling the paint quantity to be sprayed by the intensity of a light beam controlled by a picture pattern; this light beam strikes a photocell cooperating with a control unit of the spray opening of the spray gun, the photocell and/or the picture pattern being moved in synchronism with the guide movement of the spray gun. In case of manual guidance of the spray gun, the light beam is a projection beam which projects the picture pattern at the working scale onto the working surface. With automatic guidance of the spray gun, its spray opening is guided automatically row for row across the working surface.

The above object is achieved by a paint application machine which is characterized by a spray gun controlled by light intensity and electrical pulses with respect to amount of paint sprayed, a spray gun guide device and a spray control unit operating in dependence on the position of the spray gun guide device; the spray control unit consists of a picture pattern transmission device, a photocell exposed to an output beam of the picture pattern transmission device, and a control element, operating as electromechanical transducer; for the paint discharge from the spray gun opening, connected electrically. In case of manual guidance of the spray gun, the picture pattern transmission device is a projector which is mounted vibration-free independently of the telescopic arm and whose working position is adjustable; the photocell is arranged at the rear of the spray gun. The automatic scanning movement of the working surface is achieved by a hydraulic device or a motor-driven worm shaft drive. For multicolor paint application, a picture pattern scanning device having a suitable number of light sources with photocells and a suitable number of color records. Spray guns with movable cone-shaped pin, fixed cone-shaped pin or without cone-shaped pin may be used.

The invention achieves the following advantages: The drawing transfer of given originals, for example, in the form of reproducible films, is obtained without intermediate or printed carrier, templates, coatings, etc. quickly, accurately and without training in drawing for the operating personnel. Multicolor jobs are finished with one pass without having to wait for drying, with the colors being applied next to each other and also mixed. Even for the spray reproduction of color photographs, through the mixing of the colors during the application process, besides transparent liquid paints, opaque paints may be used. The viscosity of the various types of paint can be influenced such that it becomes unimportant. In particular, large areas, for example, outside facades, may be lettered or painted without a scaffold. The function of the machine can be restricted to the portion of the working surface where paint is to be supplied. The machine is transportable, so that it may be conveniently brought to the work site for interior or outside jobs.

BRIEF DESCRIPTION OF THE DRAWINGS

The invention is described by means of several embodiments in connection with the drawings. In the drawings.

DESCRIPTION OF THE PREFERRED EMBODIMENTS

In a first embodiment of the paint application method according to the invention, the spray opening of the spray gun 53 attached to a movable telescopic arm 56 (FIG. 6) is guided manually at constant distance from the working area in the zone of the picture reproduction to be produced by paint application on the object 32, and the paint to be sprayed is controlled by the transmitted light of a light beam provided by the picture pattern and generated by a projector 51. The light beam strikes a photocell D cooperating with the control unit, i.e., with the combination consisting of the electromechanical transducer 28 and the mechanical lever system 26, 27, 23, 22, 24, 25, the spray opening of spray gun 53, and located on the spray gun. The photocell D is moved synchronously with the guide movement of the spray gun 53 horizontally and vertically with the picture pattern transmission device, i.e., the combination of the light source of projector 51 and the picture pattern. The projection 51 is adjusted so that it projects the picture pattern on the working surface at the working scale.

A second embodiment of the paint application method according to the invention corresponds to the first embodiment with the important difference that the spray opening of the spray gun is guided automatically row by row over the working surface, and that the light beam is not produced by the light source of a projector, but by the light source of a picture pattern scanning device which consists of a light source 63, a projection stage carrying the picture pattern, and the photocell D which is stationary and electrically connected to the control unit of the spray gun. In this embodiment, the picture pattern moves horizontally and vertically with respect to the combination consisting of light source 63 and photocell D, synchronously with the guide movement of the spray gun.

A third embodiment of the paint application method according to the invention (FIGS. 13 to 15) corresponds to the second embodiment with the difference that the picture pattern mounted on the projection stage frame 77 is only moved synchronously vertical with the vertical guide movement of the spray gun in a plane perpendicular to the light beam, and that the photocell D, with the light source, and the beam are shifted synchronously horizontal relative to the picture pattern with the horizontal guide movement of the spray gun.

The second or third embodiment of the method can also be used for multicolor jobs. Several, for example, four, color records of the picture pattern are produced. As spray gun, a multicolor spray gun with color control and several picture pattern scanning devices are used. The guide movement of the spray gun and the synchronous movement of the photocell(s) and of the color record can be restricted to the part of the working surface where paint is to be applied by having one of the picture scanning devices control the reversal of the horizontal guide movement by scanning a working pattern (or template). In this manner in case where only part of the working surface has to operated on, for example, with lettered signs, time and effort, i.e., costs, can be saved.

FIGS. 1 to 6 illustrate various embodiments of the spray gun which consists a major part of the paint application machine according to the invention. It is characteristic of any embodiment of the spray gun that the amount of paint sprayed is controlled by light intensity or electrical pulses, respectively. The various embodiments of the spray guns differ in the manner of guidance and the possibility of use for line and half-tone work and for the single or multicolor process.

Figure 1:
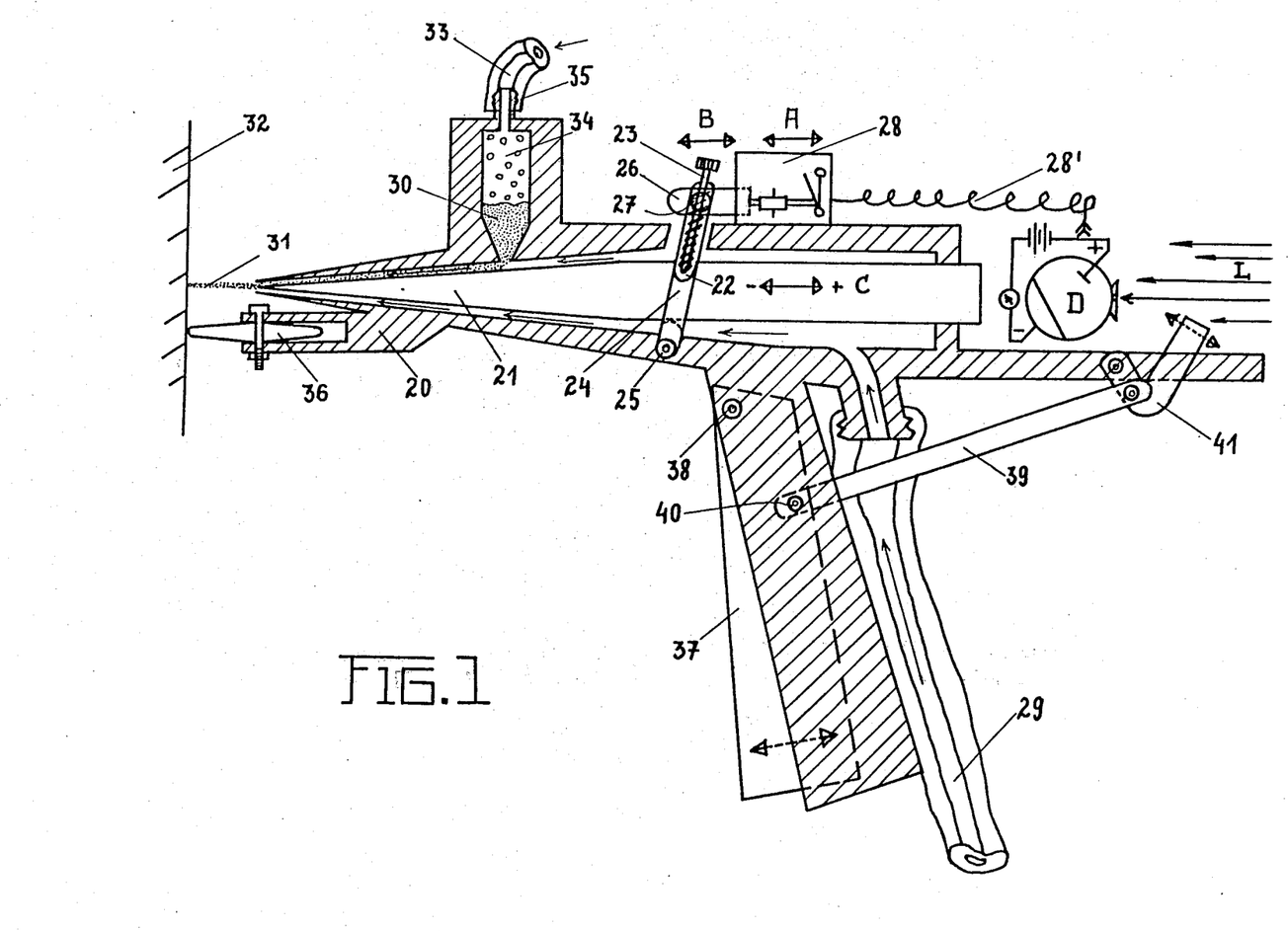
FIG. 1 shows a lengthwise section taken through a first embodiment of the spray gun of the paint application machine in accordance with the invention.
Figure 6:
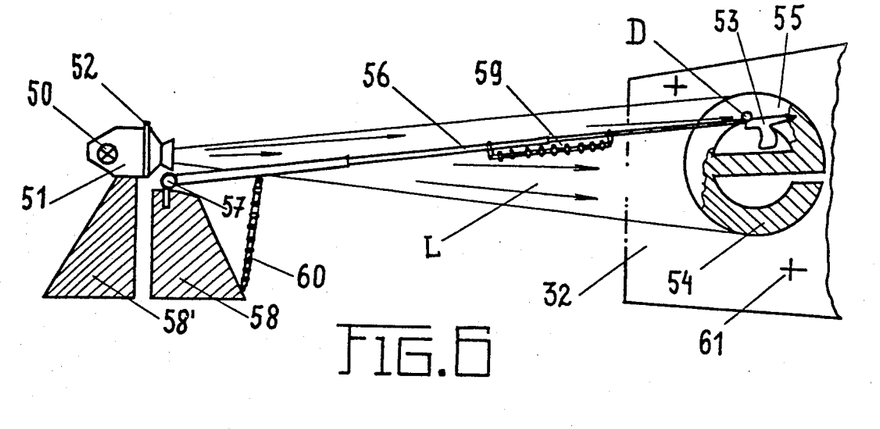
FIG. 6 shows a partially perspective side view of a first embodiment of the paint application machine according to the invention.
Figure 7:
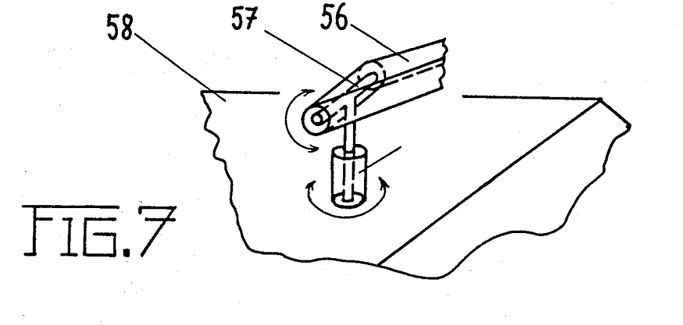
FIGS. 7 and 8 show perspective partial views of FIG. 6 on an enlarged scale.
Figure 8:
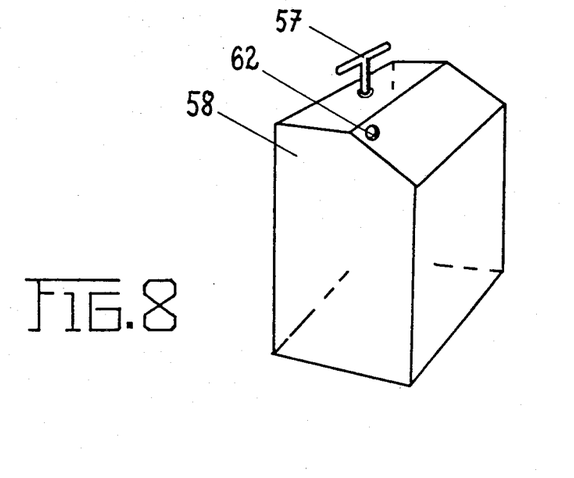

The first embodiment of the spray gun according to FIG. 1 is intended for manual guidance, particularly as part of the first embodiment of the paint application machine of FIGS. 6 to 8. According to FIG. 1, this first embodiment of the spray gun includes a solid metal housing 20 and a cone-shaped pin 21 movable therein. It has a notch 22 and is held by a fixing screw 23 in a movable linkage 24. The linkage 24 is mounted on an axis 25 in housing 20. Another rod 26 is mounted at 27 in the linkage 24 and is coupled with the electromechanical transducer in the form of a magnetic switch 28. This transducer, together with the lever system 26, 27, 23, 22, 24, 25 forms the control unit of the spray gun. The paint release device of the spray gun consists of the lever system 26, 27, 23, 22, 24, 25 actuated by the magnetic switch, the cone-shaped pin 21 controlled by the lever system, and the paint spray channel, having access to paint, with the exit opening 31. A photocell or lens D with amplifier is mounted on the rear of the spray gun so that it is exposed to the light beam L, of a projector, for example. The magnetic switch 28 responds to pulses which are provided by the photocell D and are delivered to the magnetic switch 28 via an electric cable 28'. Through an air hose 29, attached to a fitting at the underside of the housing 20, compressed air is forced into the paint spray channel, so that when the cone-shaped pin 21 is pulled back, paint 30 is carried along from the paint reservoir, attached to the topside of the forward part of the spray gun, to the exit opening 31 in order to be sprayed on the working surface of object 32.

In order to regulate the viscosity of various sprayable types of paint, a suitable air pressure is generated in the upper inside cavity 34 of the paint reservoir. The compressed air is delivered by means of another air hose 33 which is mounted on a fitting 35. A spacing wheel 36 is located on housing 20 just underneath the paint exit opening 31. When working on relatively smooth surfaces, this wheel prevents the spray gun from touching the surface and ensures a uniform optimum distance from the working surface.

The pistol grip of housing 20 holds a manually operated trigger lever 37 which rotates around 38. A linkage movably attached at 40 to the pistol grip is connected to a lens opening shutter 41 mounted pivotally at the rear portion of housing 20. Upon actuating trigger lever 37, the lens shutter 41 closes and opens the aperture of photocell D. This is necessary to block uncontrolled light which could set off the spraying process in the pistol in an undesirable manner.

Figure 2:
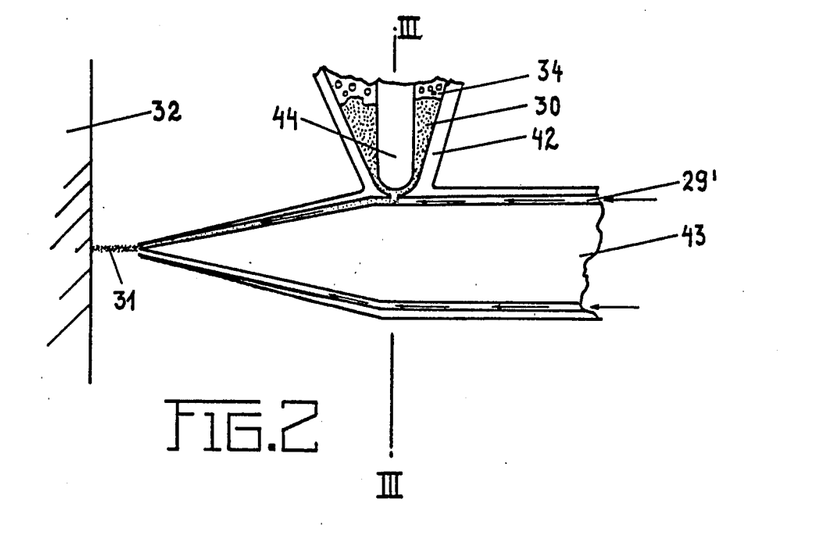
FIG. 2 shows a partial lengthwise section through a second embodiment of the spray gun of the paint application machine according to the invention.
Figure 3:
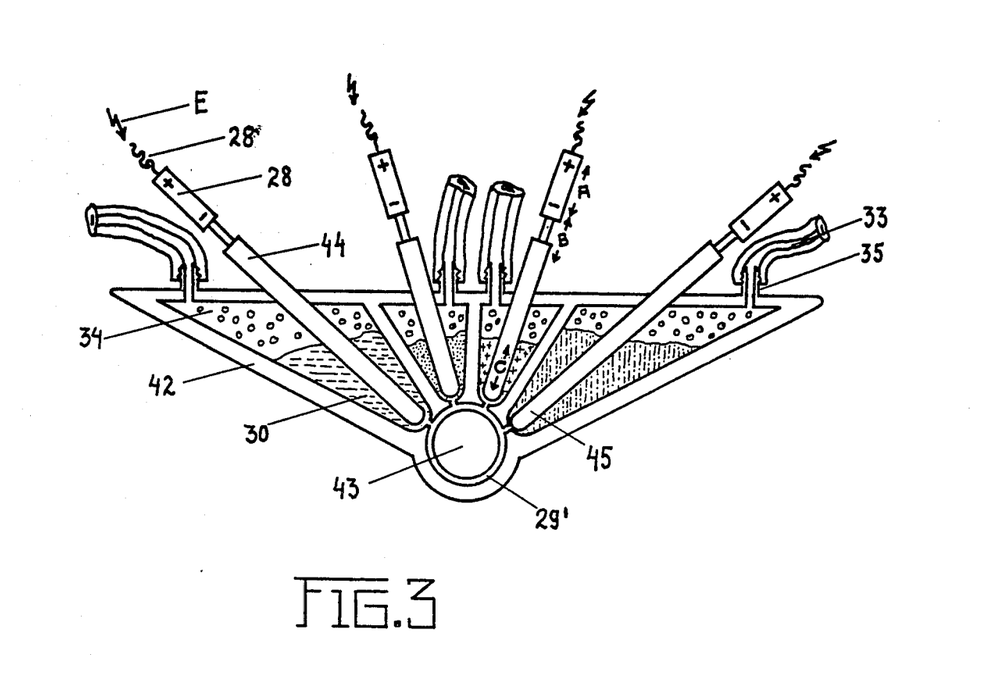
FIG. 3 shows a section taken along line III—III of FIG. 2.

FIGS. 2 and 3 shows a second embodiment of the spray gun which is suitable for uni- and multicolor paint jobs, and can be designated as relief valve spray gun. A stationary cone-shaped pin 43 is threaded into a housing 42 and is removable only for the purpose of cleaning. Compressed air introduced into channel 29' carries the pint 30 with valve 44 open to the exit opening and sprays the paint on the working surface of object 32. Air hoses 33 are connected to fittings 35 so that compressed air for regulating the viscosity of the various paints 30 can be admitted to the upper portion of the paint reservoir or the upper cavities of the paint compartments of the multicolor reservoir.

In FIG. 3, the four individual colors in the four-color spray gun are indicated by various types of hatching. There are four relief valves 44, 45, with valve 45 shown closed. These four valves are opened and closed depending on the feeding of pulses which are received via electric cables 28' from a separate photocell combination which can be designated as four-color photo adapter. With this second embodiment of the spray gun, the paint release device consists of the sliding valves 44 and 45 immersed in the paint reservoir whose bottom is hemispherical with a small opening, of the fixed cone-shaped pin 43 and the paint exit opening 31.

Figure 4:
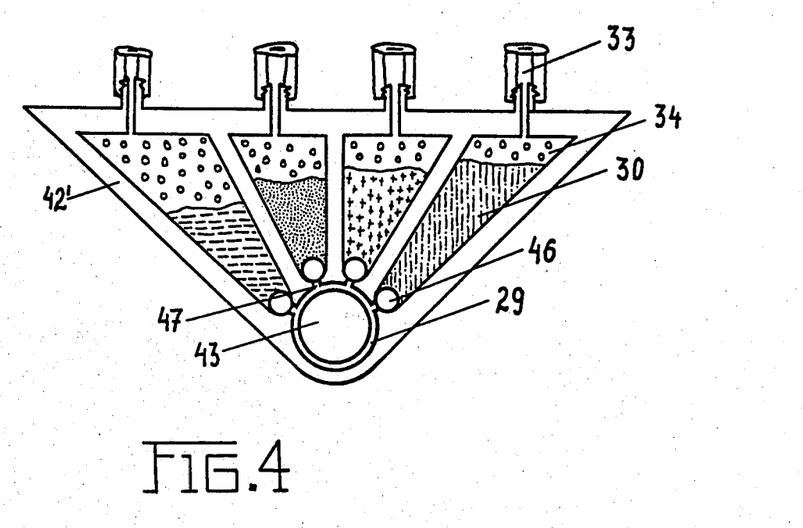
FIG. 4 shows a cross-section of another embodiment of the spray gun of the paint application machine according to the invention.
Figure 5:
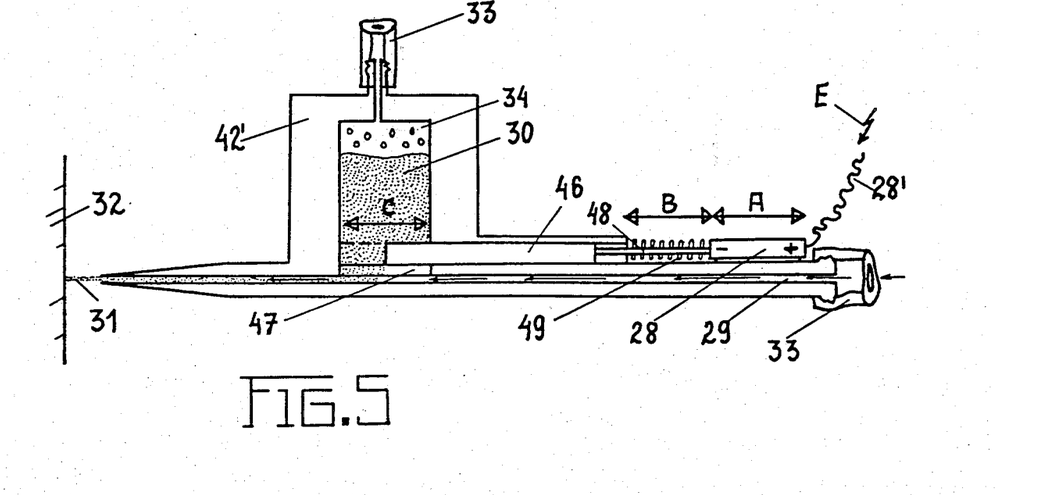
FIG. 5 shows a lengthwise section of another embodiment of the spray gun of the paint application machine according to the invention.

FIGS. 4 and 5 show a third embodiment of the spray gun for four-color and unicolor half-tone work. According to FIG. 4, a fixed cone-shaped pin 43 is threaded into housing 42', as in the second embodiment of FIGS. 2 and 3. However, the cone-shaped pin is left out in the spray gun of FIG. 5 which can only be used for unicolor jobs. However, the mode of operation of the two spray guns of FIGS. 4 and 5 according to the third embodiment is similar. The compressed air admitted through the air hose 33 to the spray channel 29' takes paint 30 flowing from slot 47, which is machined into the housing parallel to channel 29', to exit opening 31. A sliding valve 46 which is actuated via a linkage 48 by the magnetic switch 28, controls the opening of slot 47. The magnetic switch 28 again receives pulses of varying intensity from a photocell D. Depending on the pulse intensity, the magnetic switch overcomes the pressure of a spring 49. Hence in this third embodiment of the spray gun, the paint release arrangement consists of the sliding valve 46 which, with a spring between it and the magnetic switch 28, controls a slot 47, machined parallel to the spray channel 29' into the spray gun housing, without using a cone-shaped pin.

While in the embodiment of the spray gun of FIG. 1, visible projection light controls the photocell, in the embodiments of FIGS. 2, 3 and 4, 5 this is done by light in a closed housing, i.e., in an encapsulated picture pattern scanning device. The mode of operation in this method, also referred to as photoadaption, is fundamentally the same with the various embodiments of the paint spray guns. Compressed air flowing inside the spray gun to the exit opening takes along paint depending on the control by the photocell D. The latter controls the electromechanical transducer 28 which actuates a linkage which, in turn, closes or opens a valve at the right moment. It is immaterial whether in the individual case, as with FIG. 1, visible projection light enters the photocell or current pulses, generated by photoadaption and transmitted by an electric cable, act on the control unit of the spray gun. This explains why the movement, marked by the stretches A, B and C, of the corresponding elements of the spray gun in all spray gun embodiments is based on the same principle. During maximum movement, the magnetic switch 28 traverses distance A and transmits its sliding force to the linkage which travels distance B. It transmits the movement to the valve element which moves distance C. In this manner the paint release arrangement of the spray gun is controlled proportional to the intensity of the light striking the photocell D. In the first embodiment of the spray gun of FIG. 1, the movable cone-shaped pin 21 which in the forward position blocks both paint flow and compressed air flow acts as valve, while in the second and third embodiment of FIGS. 2, 3 and 4, 5 relief and sliding valves control only the paint flow, but not the compressed air flow which is present continuously and uniformly.

FIGS. 6 to 8 show a first embodiment of the paint application machine according to the invention using the spray gun of FIG. 1 and guiding it manually over the working surface of the object. Light L emitted by a light source 50 of a projector 51 true to a drawing or true to scale through a picture pattern 52, for instance, a slide or film, strikes the photocell D of spray gun 53. The combination of light source 50 and of picture pattern 52 is designated as light pattern transmission arrangement. Through the picture pattern projected on the working surface, the working surface zone 54, shown hatched, is clearly identified. When the photocell is struck by the projection light beam, it controls the paint delivery in the above-described manner. Reproduction true to the drawing is ensured by a spray gun guide arrangement which makes possible an easy holding of the spray gun in precise conformance to the beam. The spray gun guide arrangement essentially consists of a rotary and vertically pivotal telescopic arm 56 at whose free end the spray gun 53 is mounted. The telescopic arm 56 is held directly underneath the light exit opening of the vibration-free projector 51 in a T-shaped rotary member 57 which is fixed in a stand 58. The projector 51 is mounted vibration-proof on a separate stand 58' to avoid unintentional shifting of the projected picture during the operation. The foremost portion of the telescopic arm 56 is pushed against the light pressure of a spring 59 against the working surface of the object. The telescopic arm 56 itself is normally held in a horizontal position by a vertical spring 60 in order to absorb its own weight and thus to reduce human expenditure of effort as much as possible which need merely provide the deflection determined by the drawing. The spacing wheel 36 on the spray gun considerably facilitates the work. With multicolor jobs with this first embodiment of the paint application machine, a separate color record is projected per color and the pain in the gun is changed or the gun is changed. In order to fit any further color record true to projection on the working surface of the object 32, register marks 61 are placed on the working surface, for example, in the form of pasted pieces of paper. FIG. 7 shows that the T-shaped rotary member 57 can be rotated horizontally and pivoted vertically. According to FIG. 8, the stand 58 or 58' may be an aluminum sheet metal tank with struts. During non-usage, the tank is empty while during the working process it is filled with water which can be withdrawn by a pump through opening 62. These easily transported stands have great stability in usage. This first embodiment of the paint application machine is particularly well suited for coarse-grained interior and exterior jobs which are at heights within the reach of the draftsman.

FIGS. 9 to 12 show a second embodiment of the paint application machine according to the invention which operates fully automatically. Quite generally, the spray gun guide arrangement is a rotary and vertically pivotal telescopic arm 56 at whose free end the spray gun is mounted. The telescopic arm 56 which is enclosed by a traveling crab 73' mounted on a negative worm profile section 79, is driven mechanically periodically intermittent vertically by means of a hydraulic device 69 and horizontally continually by means of a worm shaft 80 driven by a motor 82. The spray control device is designed so that the picture pattern transmission unit is combined with the photocell D into a picture pattern scanning or photoadaptation device, lengthwise adjustable relative to the fulcrum of the telescopic arm 56, where the picture pattern runs in a projection stage 64 mounted by means of a traveling crab 73 on the telescopic arm 56 synchronously with the spray gun parallel to the working surface of the object 32. The paint spray gun and the picture pattern run synchronously row by row.

Figure 9:
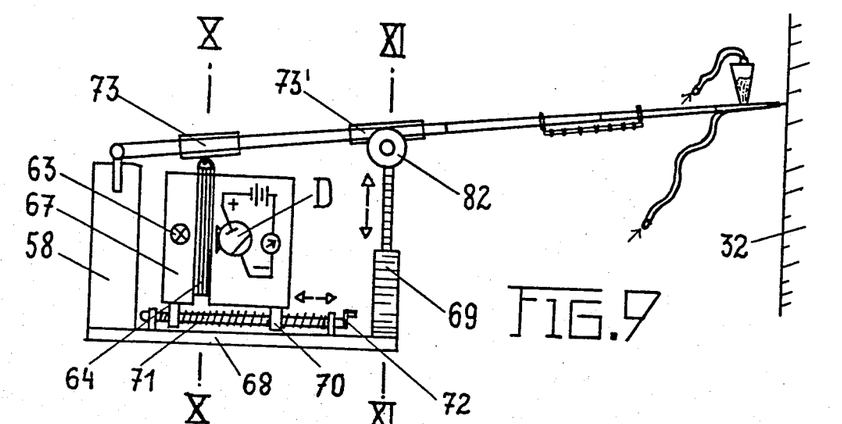
FIG. 9 shows a schematic side view of a second embodiment of the paint application machine according to the invention.
Figure 10:
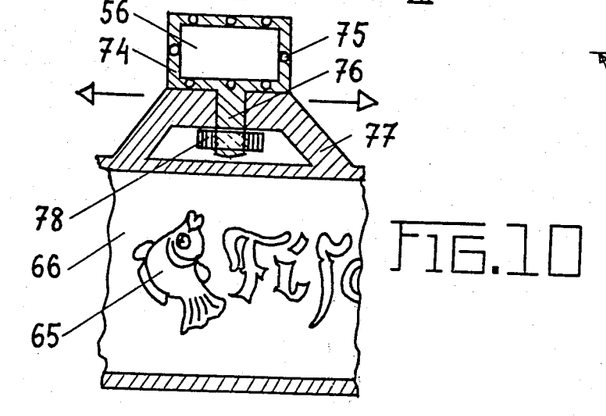
FIG. 10 shows a section taken along line X—X of FIG. 9.
Figure 11:
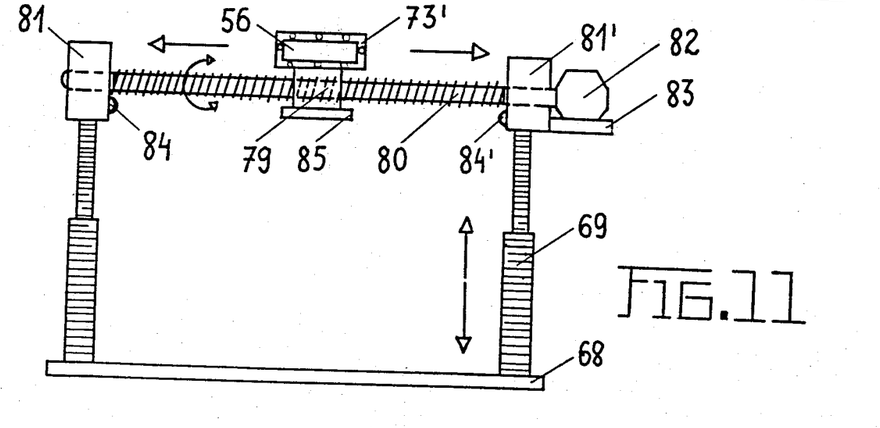
FIG. 11 shows a section taken along line XX—XI of FIG. 9.

The picture pattern scanning device consists of the light source 63 and the photocell or photolens D which are connected to each other and fixed in a housing 67. The movable projection stage 64 carrying the picture pattern 65 is arranged in between. The light-controlled electric pulses are transmitted by a cable to the control unit of the spray gun by the photocell D. The telescopic arm 56 is mounted rotatably and vertically pivotal in a T-shaped rotary member. The T-shaped rotary member is arranged on a tank 58 which rests on a base plate 68. The telescopic arm 56 is guided row by row by a hydraulic device 69 which also is mounted rigidly on the base plate 68. The latter also holds the mounting of housing 67 which is arranged with worm screws 70 on a crankshaft 71 rotatable by crank handle 72 on the base plate 68. In this manner one can adjust the picture pattern scanning device 63, 64, 67 in relation to the T-shaped rotary member, with the scale being reduced as the distance from the rotary member increases. In this manner, scale inaccuracies of the picture pattern 65, 66 to be scanned and available in film form can be compensated.

Figure 12:
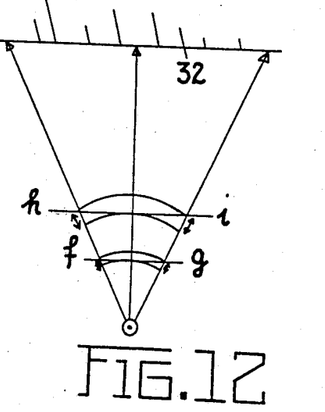
FIG. 12 shows a diagram to explain the working movements of the projection stage and the telescope arm guide.

FIG. 12 shows a diagram to explain the working movements of projection stage 64 and the telescopic arm guide 73'. It is evident that the telescopic arm 56 must lengthen in lateral outer zones relative to its center position; this is made possible by the spring attached to the forward portion of the telescopic arm. Since the projection stage 64 is to traverse the portion f-g, restrained by housing 67, parallel to the object 32, even though this portion is not arc-shaped, a projection stage suspension on the telescopic arm 56 in the form of a traveling crab 73 (FIG. 10) is used. The traveling crab 73 is movable on the square telescopic arm 56 and can be made more flexible by ball bearings 75. In the center of the traveling crab frame 74 is a welded screw lug 76 which is inserted in the upper part of the projection stage frame 77 and holds the entire projection stage 64 by a nut 78. Thus the traveling crab 73 can be guided parallel to the working surface of object 32 on the stretch f-g. The telescopic arm 56 is also enclosed by a traveling crab 73' which encloses a worm shaft 80 with a worm nut 79. According to the direction of rotation of the worm shaft 80, the nut 70 turns right or left with the traveling crab 73' and thus moves the telescopic arm 56 back and forth. Hence the traveling crab 73' can move parallel to the working surface of object 32 over the stretch h-i (FIG. 12). The worm shaft 80 is held by two bushings 81 and 81'. On the side of worm shaft 80 is a motor 82 on a plate 83 which is screw-fastened to 81'. Reversal switches 84 and 84' which are actuated by an attached linkage 85 reverse the running direction of motor 82. Also, by actuating reverse switch 84' a metered amount of liquid is withdrawn from or delivered to the hydraulic device 69 so that it moves the worm shaft 80 by one row interval downward or upward.

Figure 13:
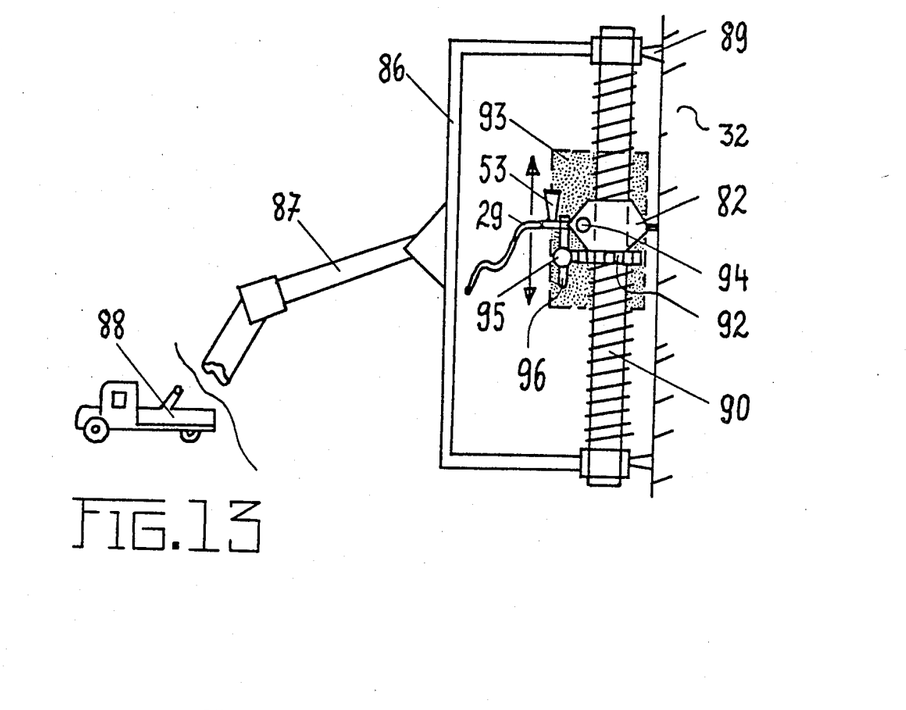
FIG. 13 shows a side view of a third embodiment of the paint application machine according to the invention.
Figure 14:
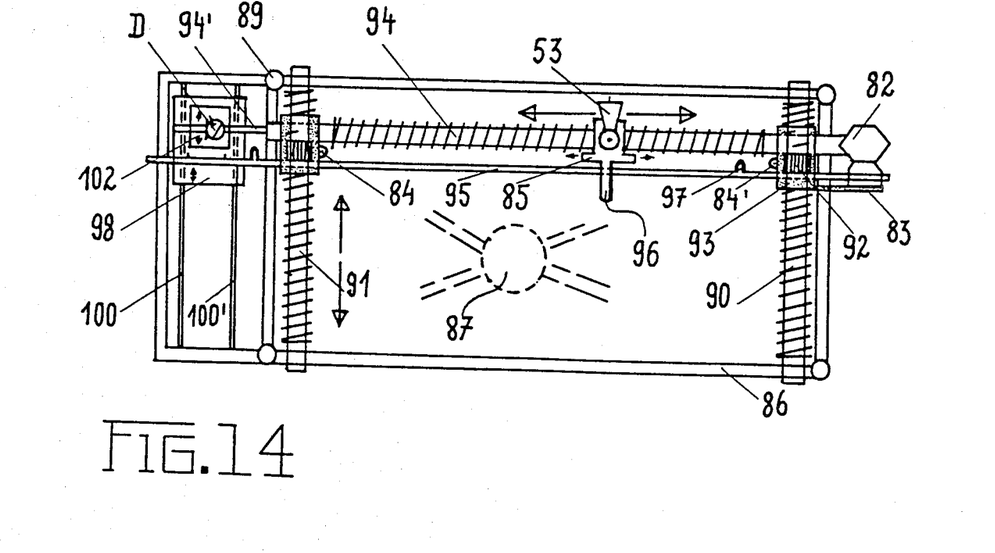
FIG. 14 shows a rear view of the third embodiment of the paint application machine according to the invention.
Figure 15:
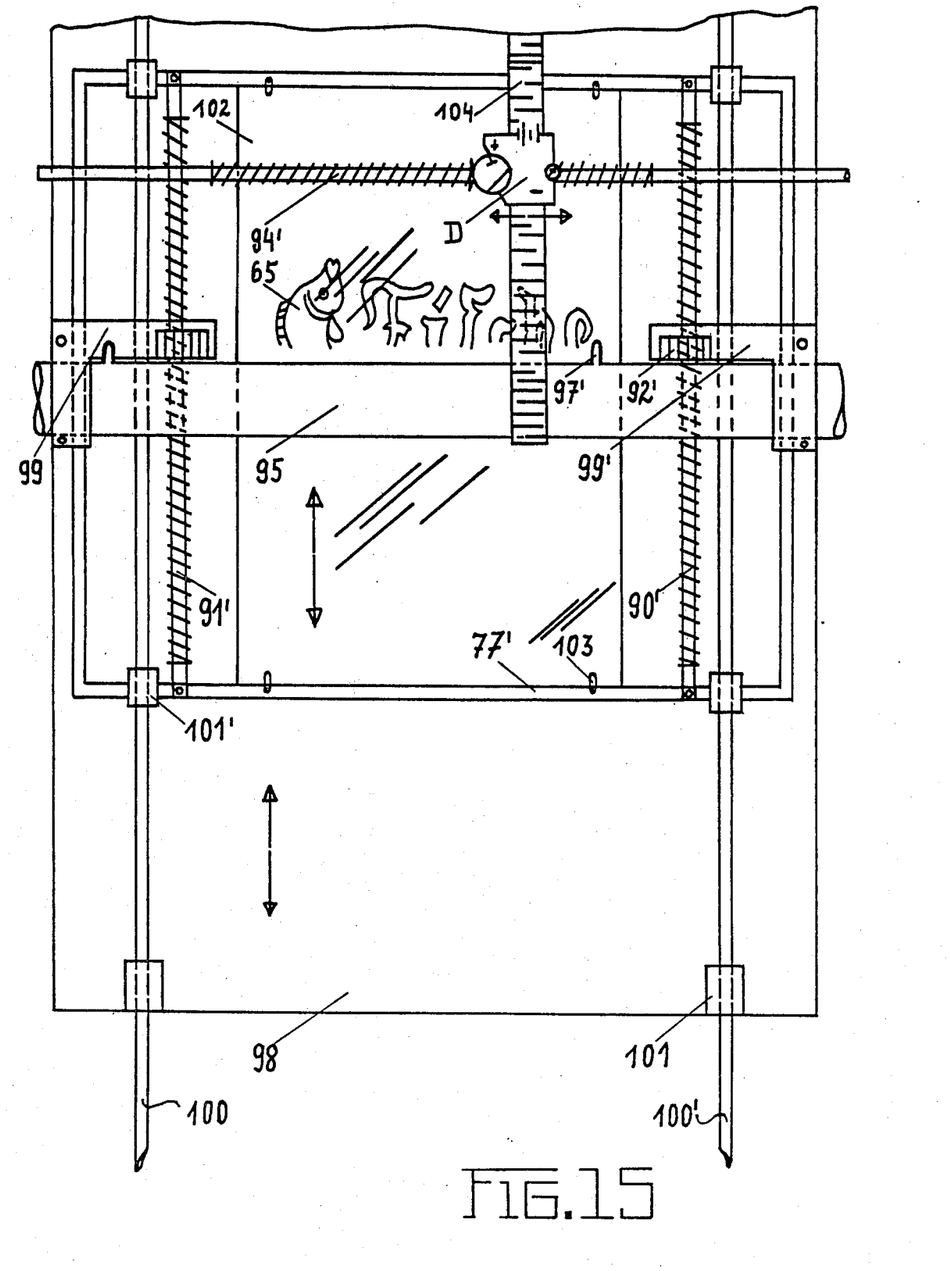
FIG. 15 shows a partially schematic side view of the spray control device of the third embodiment of the paint application machine according to FIG. 14 on an enlarged scale.

FIGS. 13 to 15 show a third embodiment of the paint application machine according to the invention which also operates fully automatic and is transportable, so that it is particularly well suited for outside facades. Quite generally, the spray gun guide unit is a base holding linkage 86 articulated by a lever device 87; fixed vertical worm shafts 90, 91, and a transverse worm shaft 94 with a vertical drive 95, 92 and driven by a motor 82 are mounted on this linkage. The worm shaft 94 holds the support 96, for spray gun 53, with negative worm profile. This support is provided with a worm rod 85 running along with it and actuating polarity reversal switches 84, 84' attached to both ends of worm shaft 94. Again the spray control device is such that the picture pattern transmission unit is combined with the photocell D into a picture pattern scanning device in a housing 98 moving up and down due to coupling with the worm shaft 94 such that the light source, with the photocell D facing it, is attached to a rod 104. This is arranged by means of a negative worm profile portion of a fine-thread worm shaft 94' coaxial with the worm shaft 94 for horizontal movement. The picture pattern held by the projection stage frame 77' is arranged between the light source and the photocell D by means of a drive consisting of two vertical fine-thread worm shafts 90, 91', two worm wheels 92' and the rod 95 for vertical periodically intermittent motion. To operate, the base support linkage 86 is pressed by means of the lever device 87 against the object to be processed, which may be done from a motor vehicle 88. The optimum distance from the working surface is maintained by shock absorbers 89.

The worm shafts 90, 91 are each enclosed by a worm wheel 92. These are mounted in bushings 93 which carry the transverse worm shaft 94 and the rod 95. The motor 82 is mounted on a base plate 83 which also is screw-fastened to bushing 93. The motor 82 drives the worm shaft in either direction depending on the command received from the polarity reversal switches 84, 84'. The vertical row shift is achieved that per right-hand run of the spray gun the rod 95 is struck once so that on the right and left two abutting projections turn the ratchet wheels 92 by one tooth gap. With this rotation of the worm gears, the picture pattern scanning device or photoadaptation device moves along with the support 96, the motor 82, the rod 95, etc.; the fine-thread worm shaft 94 of that device is coupled directly to worm shaft 94 on the side facing away from the motor 82.

FIG. 15 shows the spray control unit which is sketched in FIG. 14 on the left-hand side, according to the third embodiment of the paint application machine. The housing 98 of the picture pattern scanning device is passed around the rod 95 by a support 99, 99' and is held on the side by two vertical rods 100, 100' which are enclosed by four bushings 101 and seated solidly in the base support linkage 86. The housing 98 moves with the worm shaft 94 and the rod 95 up or down. Since the photocell D must travel a smaller distance than the spray gun, the worm shaft 94' has a suitable fine thread. The worm shafts 94 and 94' have the same center axis and the same speed. The supports 99, 99' hold the two worm gears 92' which have a correspondingly smaller toothed wheel rim and a correspondingly smaller worm negative. If the rod 95, which has two abutting projections 97', per right-hand run of the spray gun moves the gears 92' by one tooth, they move along the fine-thread worm shafts 90', 91' against the working direction of the worm shaft 94 up or down. At the upper and lower edge of the two fine-thread worm shafts is the projection stage frame 77' which moves along with the movement of these shafts and is held stable by the bushings 101' by means of rods 100, 100'. The projection stage frame 77' shown here holds two glass plates 102 by supports 103 which clamp the film or the drawing. Here also the turning of the photocell with the fine-thread worm shaft 94' must be prevented. For this purpose, the rod 104 carrying the photocell D is constructed so that it encloses the rod 95, and leads upward such that the highest position of the projection stage frame 77' is taken into consideration, then leads backwards and then drops again, holding the light source behind the projection stage precisely at the point where the photocell D is located in front of the projection stage.

In a different way, the picture scanning device may be spaced apart from the spray gun guide unit. It would then be driven by a separate motor which must have the same speed as motor 82.

Figure 16:
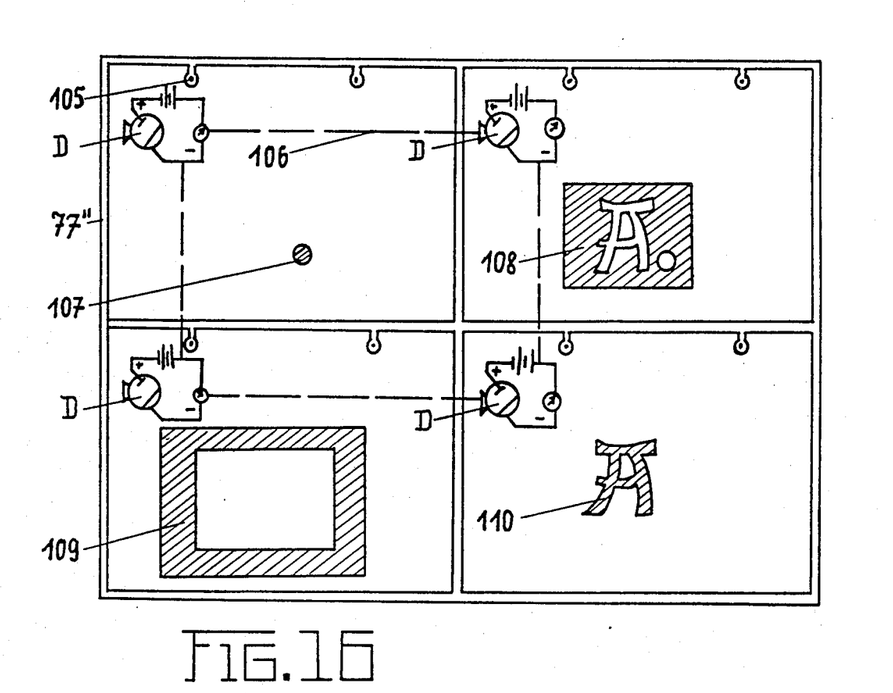
FIG. 16 shows a schematic view of a projection stage frame for a four-color process for use with the paint application machine according to the invention.

FIG. 16 shows a projection stage frame 77 for a four-color process for use with the third embodiment (FIGS. 13 to 15) of the paint application machine in conjunction with a four-color spray gun according to FIG. 3 or 4. Here the projection stage frame 77" which is divided into four equal areas, carries film slides which are designated as color records and are hung by means of a perforation 105 in frame 77". Again, glass plates are used to achieve a flat drawing plane. By using a fine-thread worm shaft 94' and fine-thread worm shafts 91' of half the size, half a run is made possible both horizontally and vertically. Four light sources with photocells D are fastened to a linkage 106 which is driven by the smaller worm shaft. Hence the photocells D move only half the distance in the horizontal direction. This also holds for the vertical movement of the projection stage frame 77". Hence every photocell scans the associated color record 107, 108, 109 or 110 of its color and furnishes analogous electrical pulses.

Figure 17:
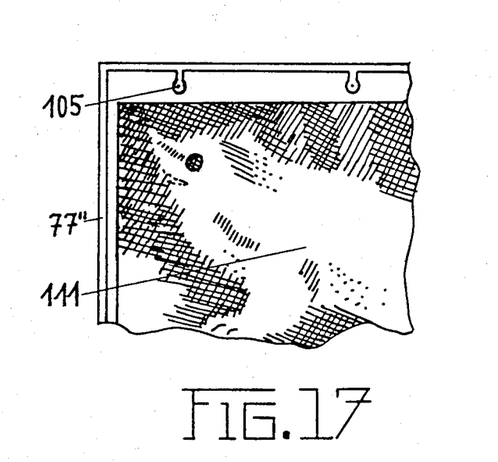
FIG. 17 shows a broken-away and supplemented partial view of FIG. 16 on an enlarged scale.

In case of half-tone work with a four-color spray gun according to FIG. 4, half-tone color records, as indicated by 111 (FIG. 17) are hung into the projection stage frame 77" instead of solid-color records.

Figure 18:
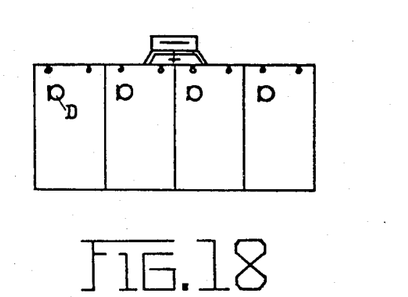
FIG. 18 shows a schematic of the projection stage frame used for the second embodiment of the paint application machine for a four-color process.

For the second embodiment (FIGS. 9 to 11) of the paint application machine, multicolor work requires an arrangement of the projection stage frame 77 as shown schematically in FIG. 18. The color records are arranged next to one another, and four adjacent photocells are needed.

Figure 19:
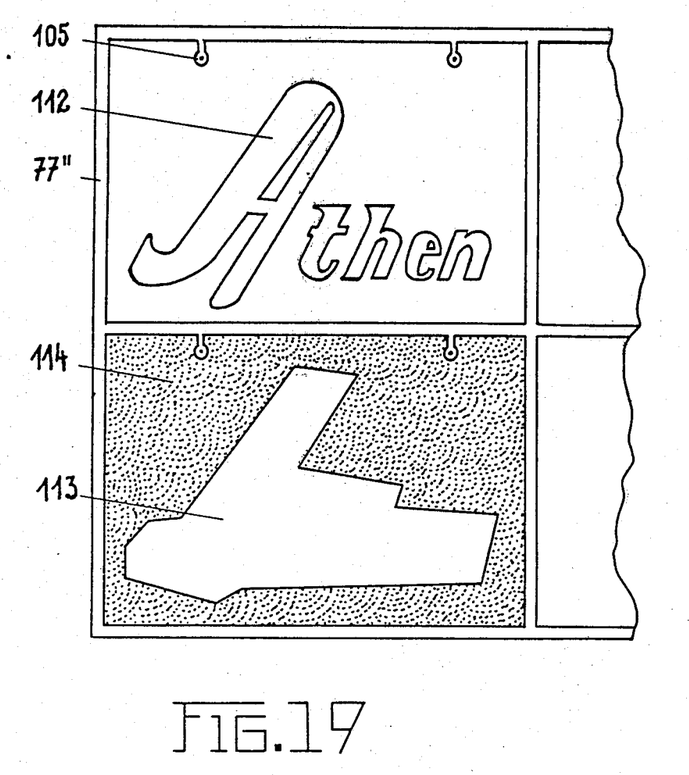
FIG. 19 shows a schematic view of part of the projection stage frame to explain the working area boundary.

FIG. 19 shows a schematic of part of the projection stage frame 77" to explain the working area boundary. The advantage of this measure is the possibility of not having to let the spray control unit and the spray gun cover the entire frame size of the paint application machine. This has special significance with picture elements which project extremely from the block. A possibly free picture pattern scanning device can scan a cut-out template 114 which includes only area 113, as shown here. If the photocell D of this picture pattern scanning device is not exposed to light at 113, the drive motor 82 reverses immediately and assumes the function of polarity reversal switches 84, 84'. Area 114, which does not transmit light, remains not being processed. Another working surface saving can be achieved by enlarging the polarity reversal rod 85 to the right and left so that with a large frame size the machine need not run through its full transverse dimension. If the forward run of the spray gun is used as work run in order to avoid the disadvantage of a delay of the discharge of very viscous paints, a suitable gear drive may be provided which accelerates the return run of the spray gun. The spray control unit may be left on the transport vehicle if another motor is used which runs in synchronism with motor 82 and has the same speed.

I claim:

1. A paint application method comprising the steps of: guiding the spray opening of a spray gun at a constant distance from the working surface in the zone of picture reproduction; forcing paint into an air flow by pressure; controlling an amount of sprayed paint by the intensity of a light beam striking a photocell and controlled by a picture pattern; and moving photocell and the picture pattern synchronously with guide movement of the spray gun.

2. A paint application method as defined in claim 1 wherein said step of guiding the spray opening is a manual step.

3. A paint application method as defined in claim 1 wherein said step of guiding the spray opening is carried out automatically.

4. A paint application method as defined in claim 2 wherein the light beam is a projection beam for projecting the picture pattern at the working scale on the working surface.

5. A paint application method as defined in claim 2 including the step of guiding the spray opening row for row over the working surface.

6. A paint application method as defined in claim 1 including the step of electrically connecting a stationary photocell to a control element of the spray gun.

7. A paint application method as defined in claim 1 including the steps of mechanically connecting a photocell to the spray gun; displacing the picture pattern vertically in synchronism with the vertical guide movement of the spray gun in a plane perpendicular to the beam; and displacing the photocell with light source and beam horizontally in synchronism with the horizontal guide movement of the spray gun relative to the picture pattern.

8. A paint application method as defined in claim 1 including the steps of producing a plurality of color records of the picture pattern; using a multicolor spray gun with selective paint control and a plurality of light sources with photocells.

9. A paint application method as defined in claim 8 including the steps of restricting the guide movement of the spray gun and the synchronous movement of photocells, the picture pattern and the color records to the working surface to be processed by paint application; controlling polarity reversal by scanning a working template through one of the picture pattern scanning devices comprising a light source, photocell and picture pattern.

10. A paint application machine comprising: a spray gun controlled with respect to spray paint quantity by light intensity and electric pulses; a spray gun guide device; a spray control unit operating in dependence on the position of said spray gun guide device, said spray control unit comprising a picture pattern transmission device, a photocell receiving an output beam of said picture pattern transmission device, and a control element operating as electro-mechanical transducer electrically connected thereto for paint discharge from said spray gun.

11. A paint application machine as defined in claim 10 wherein said spray gun guide device comprises a rotary and vertically pivotal telescopic arm with a free end for mounting said spray gun, said picture pattern transmission device comprising a projector mounted vibration-free independently of said telescopic arm with an adjustable working position, said photocell being located on a rear side of said spray gun.

12. A paint application machine as defined in claim 10 wherein said spray gun guide device comprises a rotary and vertically pivotal telescopic arm with a free end for mounting said spray gun, said telescopic arm being enclosed by a traveling crab mounted on a negative worm profile section, said telescopic arm being mechanically driven periodically intermittent vertical by a hydraulic device and continuously horizontally by a worm shaft driven by a motor, said spray control unit being constructed so that said picture pattern transmission device is combined with said photocell into a picture pattern scanning device having lengthwise adjustment relative to the fulcrum of said telescopic arm; a projection stage mounted via said traveling crab on said telescopic arm, a picture pattern traveling in said projection stage synchronously with said spray gun parallel to a working surface of an object.

13. A paint application machine as defined in claim 10 wherein said spray gun guide device comprises a base support linkage; a lever arrangement holding said base support linkage; stationary vertical worm shafts and a transversely mounted worm shaft driven by a motor and having a vertical drive; a support carrying said spray gun with a negative worm profile; said spray control unit being constructed so that said picture pattern transmission device is combined with said photocell into a picture pattern scanning device in a housing; said housing moving up and down due to coupling with said transversely mounted worm shaft; a light source; a rod linkage, said light source being fastened with said photocell to said rod linkage arranged by means of a negative worm profile section of a fine-thread worm shaft coaxial with said transversely mounted worm shaft for horizontal movement; a picture pattern held by a projection stage frame being placed by means of a drive comprising two vertical fine-thread worm shafts, two ratchet wheels and a ratchet rod for vertical periodically intermittent movement between said light source and said photocell.

14. A paint application machine as defined in claim 13 wherein said negative worm profile section comprises a negative worm profile with a rotating rod for actuating polarity reversal switches fastened near both ends of said transversely mounted worm shaft.

15. A paint application machine as defined in claim 12 including a projection stage frame for carrying color records, said picture pattern scanning device comprising four adjacent light sources with photocells; said picture pattern comprising four suitably arranged color records, horizontal movement of said projection stage frame being reduced in the ratio 1 to 4.

16. A paint application machine as defined in claim 13 wherein said picture pattern scanning device comprises four light sources with photocells mounted on a rod, said projection stage frame being divided into four equal areas for four color records, said vertical worm shafts and said transversely mounted worm shaft being dimensioned for half the movement of said projection stage frame and said light sources and photocells.

17. A paint application machine as defined in claim 10 including a photoelectric transducer comprising a photocell.

18. A paint application machine as defined in claim 10 including a photoelectric transducer comprising a photolens with amplifier.

19. A paint application machine as defined in claim 10 wherein said spray gun comprises an electromagnetic transducer comprising a magnetic switch connectable to said photocell, and a paint release device actuated by said magnetic switch.

20. A paint application machine as defined in claim 19 wherein said paint release device comprises a lever system actuated by said magnetic switch; a movable cone-shaped pin controlled by said lever system; and a paint spray channel with exit opening and paint inlet.

21. A paint application machine as defined in claim 19 wherein said paint release device comprises a slide valve immersed in a paint reservoir having a hemispherical bottom and a small opening, a fixed cone-shaped pin and a paint exit opening.

22. A paint application machine as defined in claim 19 wherein said paint release device comprises a slide valve, a spring between said slide valve and said magnetic switch, said slide valve controlling a slot in said spray gun parallel to a spray channel in said spray gun with a fixed cone-shaped pin.

23. A paint application machine as defined in claim 19 including an electric cable for connecting said photocell to said electromagnetic transducer; a pistol grip and a trigger lever linkage located inside that pistol grip; a lens shutter of said photocell being controlled by said trigger lever linkage, said photocell being fastened to a rear side of said spray gun to be affected by light.

24. A paint application machine as defined in claim 21 including a paint spray channel, a spray gun housing holding said paint spray channel; air connection fittings on top of said paint reservoir and on said spray channel; air hoses connecting to said air connection fittings.

25. A paint application machine as defined in claim 19 including a paint reservoir with four compartments, four slide valves, four magnetic switches, four connecting fittings, and four hoses connected thereto.

26. A paint application machine as defined in claim 19 including a spacer wheel, a spray gun housing and a paint exit opening, said spacer wheel being located on said spray gun housing immediately below said paint exit opening.

* * * * *